US006855452B1

(12) United States Patent
Cooper et al.

(10) Patent No.: US 6,855,452 B1
(45) Date of Patent: Feb. 15, 2005

(54) ELECTRODE STRUCTURE

(75) Inventors: Susan Joy Cooper, Reading (GB); Gregor Hoogers, Birkenfeld (DE)

(73) Assignee: Johnson Matthey Public Limited Company, London (GB)

(*) Notice: Subject to any disclaimer, the term of this patent is extended or adjusted under 35 U.S.C. 154(b) by 0 days.

(21) Appl. No.: 09/857,759

(22) PCT Filed: Dec. 9, 1999

(86) PCT No.: PCT/GB99/04081

§ 371 (c)(1),
(2), (4) Date: Sep. 10, 2001

(87) PCT Pub. No.: WO00/35037

PCT Pub. Date: Jun. 15, 2000

(30) Foreign Application Priority Data

Dec. 9, 1998 (GB) .............................................. 9826940

(51) Int. Cl.⁷ ............................ H01M 4/90; H01M 4/92
(52) U.S. Cl. .............................. 429/41; 429/40; 429/42
(58) Field of Search ................................ 429/40–44, 30

(56) References Cited

U.S. PATENT DOCUMENTS

| | | | |
|---|---|---|---|
| 3,765,947 A | | 10/1973 | Felten et al. |
| 3,884,838 A | | 5/1975 | Fleming et al. |
| 4,232,097 A | | 11/1980 | Shanks et al. |
| 4,552,857 A | * | 11/1985 | Katz et al. .................. 502/101 |
| 5,795,669 A | * | 8/1998 | Wilkinson et al. ............ 429/40 |
| 5,939,220 A | * | 8/1999 | Gunner et al. ................ 429/40 |
| 6,165,636 A | * | 12/2000 | Giallombardo et al. ....... 429/44 |
| 6,183,894 B1 | * | 2/2001 | Adzic et al. .................. 429/13 |
| 6,287,717 B1 | * | 9/2001 | Cavalca et al. ............... 429/40 |

FOREIGN PATENT DOCUMENTS

| | | |
|---|---|---|
| EP | 0 450 849 | 10/1991 |
| EP | 0 731 520 | 9/1996 |
| EP | 0 736 921 | 10/1996 |
| EP | 0 838 872 | 4/1998 |
| JP | 5-135772 | 6/1993 |
| WO | 92/16027 | 9/1992 |

OTHER PUBLICATIONS

Gottesfeld, Shimshon and Pafford, Judith, "A New Approach to the Problem of Carbon Monoxide Poisoning in Fuel Cells Operating at Low Temperatures," *J. Electrochem. Soc.:* Accelerated Brief Communication, Oct. 1988, pp. 2651–2652.

Niedrach, L. W.; McKee, D. W.; Paynter, J.; and Danzig, I. F., "Electrocatalysts for Hydrogen/Carbon Monoxide Fuel Cell Anodes," *Electrochemical Technology,* Jul.–Aug. 1967, vol. 5, No. 7–8, pp. 318–323.

Chen, K. Y.; Shen, P. K.; and Tseung, A. C. C., "Anodic Oxidation of Impure $H_2$ on Teflon–Bonded Pt–Ru/$WO_3$/C Electrodes," *J. Electrochem. Soc.,* vol. 142, No. 10, Oct. 1995, pp. L185–L187.

Niedrach, L. W. and Weinstock, I. B., "Performance of Carbon Monoxide in Low–Temperature Fuel Cells Containing Oxide Catalysts," *Electrochemical Technology,* Sept.–Oct. 1965, vol. 3, No. 9–10, pp. 270–275.

Götz, M. and Wendt, H., "Binary and ternary anode catalyst formulations including the elements W, Sn and Mo for PEMFCs operated on methanol or reformate gas," *Electrochimica Acta,* vol. 43, No. 24, pp. 3637–3644, 1988.

Tseung, A. C. C.; Shen, P. K.; and Chen, K. Y., "Precious metal/hydrogen bronze anode catalysts for the oxidation of small organic molecules and impure hydrogen," *Journal of Power Sources,* vol. 61, 1966, pp. 223–225.

International Search Report dated Mar. 29, 2000.
British Search Report dated Mar. 3, 1999.

* cited by examiner

*Primary Examiner*—Tracy Dove
(74) *Attorney, Agent, or Firm*—RatnerPrestia

(57) ABSTRACT

A poison tolerant anode structure for use in fuel cells, in particular suitable for use on proton exchange membrane fuel cells, comprising a first catalytic component Pt—Y where Y is a bronze forming element, and optionally a third metal X alloyed with the platinum, and a second catalytic component Pt—M where M, metal, is alloyed with the platinum. An anode, a catalysed membrane, a membrane electrode assembly and a fuel cell comprising the electrode structure, are disclosed.

11 Claims, 5 Drawing Sheets

ELECTRODE STRUCTURE

Figure 1:
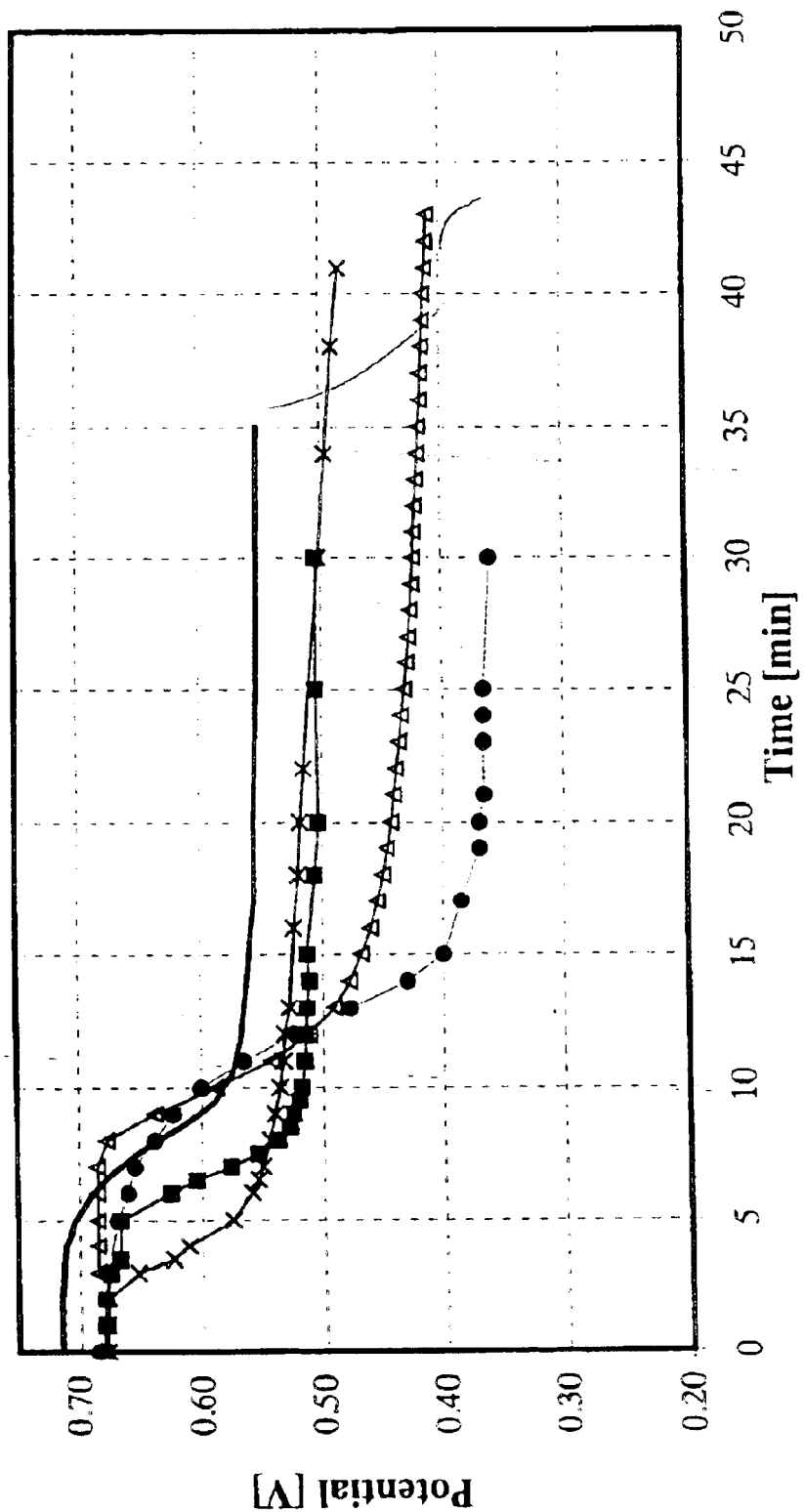

The invention relates to an improved electrode structure and specifically to a poison-tolerant anode structure for fuel cells, suitable for use in particular in proton exchange membrane fuel cells. The invention further relates to an anode, a catalysed membrane, a membrane electrode assembly and a fuel cell comprising said electrode structure.

Electrochemical cells invariably comprise at their fundamental level a solid or liquid electrolyte and two electrodes, the anode and cathode, at which the desired electrochemical reactions take place. A fuel cell is an energy conversion device that efficiently converts the stored energy of its fuel into electrical energy by combining hydrogen, stored as a gas, or methanol, stored as a liquid or gas, with oxygen to generate electrical power. The hydrogen or methanol is oxidised at the anode and oxygen reduced at the cathode. In these cells gaseous reactants and/or products have to be diffused into and/or out of the cell electrode structures. The electrodes therefore are specifically designed to be porous to gas diffusion in order to optimise the contact between the reactants and the reaction sites in the electrode to maximise the reaction rate. An electrolyte is required which is in contact with both electrodes and which may be alkaline or acidic, liquid or solid. In a solid polymer fuel cell (SPFC), also known as a proton-exchange membrane fuel cell (PEMFC), the electrolyte is a solid proton-conducting polymer membrane, commonly based on perfluorosulphonic acid materials. These electrolytes must be maintained in a hydrated form during operation in order to prevent loss of ionic conduction through the electrolyte; this limits the operating temperature of the PEMFC to between 70° C. and 120° C., depending on the operating pressure. The PEMFC does, however, provide much higher power density output than the other fuel cell types, and can operate efficiently at much lower temperatures. Because of this, it is envisaged that the PEMFC will find use in vehicular power generation and small-scale residential power generation applications. In particular, vehicle zero-emission regulations have been passed in areas of the United States that are likely to restrict the use of the combustion engine in the future. Pre-commercial PEMFC-powered buses and prototype PEMFC-powered vehicles are now being demonstrated for these applications.

Due to the relatively low operating temperatures of these systems, the oxidation and reduction reactions require the use of catalysts in order to proceed at useful rates. Catalysts, which promote the rates of electrochemical reactions, such as oxygen reduction and hydrogen oxidation in a fuel cell, are often referred to as electrocatalysts. Precious metals, in particular platinum, have been found to be the most efficient and stable electrocatalysts for all low-temperature fuel cells operating below 300° C. The platinum electrocatalyst is provided as very small particles (~20–50Å) of high surface area, which are often, but not always, distributed on and supported by larger macroscopic conducting carbon particles to provide a desired catalyst loading. Conducting carbons are the preferred materials to support the catalyst.

In the PEMFC the combined laminate unit formed from the membrane and the two electrodes is known as a membrane electrode assembly (MEA). The MEA will typically comprise several layers, but can in general be considered, at its basic level, to have five layers, which are defined principally by their function. On either side of the membrane an anode and cathode electrocatalyst is incorporated to increase the rates of the desired electrode reactions. In contact with the electrocatalyst containing layers, on the opposite face to that in contact with the membrane, are the anode and cathode gas diffusion substrate layers. The anode gas diffusion substrate is designed to be porous and to allow the reactant hydrogen or methanol to enter from the face of the substrate exposed to the reactant fuel supply, and then to diffuse through the thickness of the substrate to the layer which contains the electrocatalyst, usually platinum metal based, to maximise the electrochemical oxidation of hydrogen or methanol. The anode electrocatalyst layer is also designed to comprise some level of the proton conducting electrolyte in contact with the same electrocatalyst reaction sites. With acidic electrolyte types the product of the anode reaction are protons and these can then be efficiently transported from the anode reaction sites through the electrolyte to the cathode layers. The cathode is also designed to be porous and to allow oxygen or air to enter the substrate and diffuse through to the electrocatalyst layer reaction sites. The cathode electrocatalyst combines the protons with oxygen to produce water. Product water then has to diffuse out of the cathode structure. The structure of the cathode has to be designed such that it enables the efficient removal of the product water. If water builds up in the cathode, it becomes more difficult for the reactant oxygen to diffuse to the reaction sites, and thus the performance of the fuel cell decreases. In the case of methanol fuelled PEMFCs, additional water is present due to the water contained in the methanol, which can be transported through the membrane from the anode to the cathode side. The increased quantity of water at the cathode requires removal. However, it is also the case with proton exchange membrane electrolytes, that if too much water is removed from the cathode structure, the membrane can dry out and the performance of the fuel cell also decreases.

The complete MEA can be constructed by several methods. The electrocatalyst layers can be bonded to one surface of the gas diffusion substrates to form what is known as a gas diffusion electrode, which can be either an anode or a cathode. The MEA is then formed by combining two gas diffusion electrodes with the solid proton-conducting membrane. Alternatively, the MEA may be formed from two porous gas diffusion substrates and a solid proton-conducting polymer membrane which has been catalysed on both sides; or indeed the MEA may be formed from one gas diffusion electrode and one gas diffusion substrate and a solid proton-conducting polymer catalysed on the side facing the gas diffusion substrate.

Electrodes, catalysed membranes or MEA's are employed in many different electrochemical devices in addition to fuel cells, including metal-air batteries, electrochemical gas sensors, and electrochemical reactors for the electrosynthesis of useful chemical compounds.

In most practical fuel cell systems, the hydrogen fuel is produced by converting a hydrocarbon-based fuel (such as methane) or an oxygenated-hydrocarbon fuel (such as methanol) to hydrogen in a process known as reforming. This fuel, referred to as reformate, contains (in addition to hydrogen) high levels of carbon dioxide ($CO_2$), of around 25%, and small amounts of impurities such as carbon monoxide (CO), typically at levels of around 1%. For fuel cells operating at temperatures below 200° C., and especially for the PEMFC operating at temperatures around 100° C., it is well known that CO, even at levels of 1–10 ppm, is a severe poison for the platinum electrocatalysts present in the electrodes. This leads to a significant reduction in fuel cell performance, ie the cell voltage at a given current density is reduced. This deleterious effect is more pronounced in PEMFCs operating at lower temperatures. In addition, it has been found that the $CO_2$ present in the fuel stream can also cause a loss of performance. This performance decay is usually small compared to the effect of CO.

Various methods have been employed to alleviate anode CO poisoning. For example, reformer technology has been redesigned to include an additional catalytic reactor, known as a preferential or selective oxidation reactor. This involves the injection of air or oxygen into the hydrogen-containing reactant gas stream, prior to it passing over the selective oxidation catalyst, to oxidise the CO to $CO_2$. This can reduce the levels of CO from 1–2% down to below 100 ppm. However, even at these levels, the anode electrocatalyst in the PEMFC is still poisoned.

It has also been found that poisoning of the electrocatalyst by CO at levels of 1–100 ppm can be reduced by the use of an oxygen or air bleed directly into the anode gas stream just before it enters the anode chamber of the fuel cell itself. This is described by Gottesfeld and Pafford in J. Electrochem. Soc., 135, 2651 et seq (1988). This technique is believed to have the effect of oxidising the residual CO in the fuel to $CO_2$, the reaction being catalysed by electrocatalyst sites present in the anode:

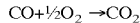
$CO + \tfrac{1}{2}O_2 \rightarrow CO_2$

This technique provides fuel cell performance that is much closer to the performance observed when no CO is present in the fuel stream. However, the air bleed technique does not usually improve the deleterious effects of $CO_2$ on performance and there are concerns over the long-term sustainability of the cell performance when this approach is employed. This is particularly the case if high levels of air bleed, equivalent to 4% and above of the total reformate fuel volume, are required.

However, the preferred technique for alleviating fuel cell performance reduction due to anode CO poisoning is to employ an anode electrocatalyst that is itself more poison-tolerant, but which still functions as a hydrogen oxidation catalyst in the present of CO. As described by, for example, Niedrach et al in Electrochem. Technol., 5, 318, (1967), the use of a bimetallic anode electrocatalyst comprising platinum/ruthenium, rather than the more conventionally-used mono-metallic platinum-only electrocatalyst, shows a reduction in the poisoning effect of the CO at typical PEMFC operating temperatures. However, again, it was not possible fully to attain the performance observed on pure hydrogen, ie in the absence of CO in the fuel stream, by using this approach in isolation.

There have been a number of attempts to improve the performance of anode electrocatalysts operating in the presence of hydrogen fuels containing CO. These have taken the approach of modifying existing state-of-the-art catalysts, such as combining platinum/ruthenium with other components. In 1995, Chen et al (J. Electrochem. Soc., 142, (10)) discussed the need to develop CO-tolerant catalysts and studied the oxidation of impure $H_2$ on Teflon®-bonded carbon-supported platinum/ruthenium/tungsten oxide electrodes. The use of tungsten oxide ($WO_3$) as a promoter of improved activity of platinum catalysts towards impure $H_2$ was not new. As far back as 1965, it was known that tungsten oxides were effective in promoting the electro-oxidation of CO on platinum-containing electrodes in acid-electrolyte fuel cells (Niedrach and Weinstock, Electrochem. Technol., 3, 270–5 (1965)). A more recent example of a catalyst having improved CO tolerance is given in European patent specification no. EPA 838 872.

EPA 838 872 relates to a ternary catalyst comprising Pt—M—Y, wherein Pt—M is an alloy of platinum and one or more metals selected from the transition metal elements or from Groups IIIA or IVA of the Periodic Table in "Handbook of Chemistry and Physics" 64th Edition, CRC Press, and Y is a bronze forming element or an oxide thereof, characterised in that the Pt—M alloy is in intimate contact with Y, and provided that M is not Ru if Y is $WO_3$.

However, such electrocatalysts aimed at improving CO tolerance apparently do not also have the effect of improving performance when $CO_2$ is present in the reformate fuel. Hence, for example, in the case of certain materials described in EPA 838 872, improved CO tolerance is observed, but at the same time the presence of $CO_2$ in the reformate stream causes larger performance losses than those observed with state-of-the-art alloys of platinum and ruthenium. This behaviour is most likely due to the CO tolerance mechanism for the catalysts described in EPA 838 872 differing from that observed with Pt/Ru alloys.

We have now surprisingly found that significant improvement in both CO and $CO_2$ tolerance can be achieved by providing an electrode structure in which the state-of-the-art Pt/Ru-type electrocatalyst is functionally linked with a further electrocatalyst. This has never before been achieved.

An anode structure of the present invention when used in a PEMFC shows improved tolerance to both CO and $CO_2$ poisons whilst maintaining high activity for the desired electrochemical reaction, and is therefore of use in fuel cells which use an impure feed. The anode structure may be of benefit in both phosphoric acid and solid polymer fuel cells. Specifically, it shows tolerance to both CO and $CO_2$ poisons in reformate fuel. The anode structure may also be of benefit in these fuel cells when the fuel is methanol.

Accordingly, the present invention provides an electrode structure, comprising a first catalytic component and a second catalytic component, characterised in that the first catalytic component comprises one or more electrocatalyst(s) of formula Pt—Y where Y is a bronze forming element, and optionally a third metal component X which is alloyed with the platinum, and the second catalytic component which comprises one or more electrocatalyst(s) of formula Pt—M where M is a metal alloyed with the platinum.

The term "functionally linked" in the context of the present invention means that both materials are in ionic contact with each other. This may be achieved by adding an ion conducting material to each of the catalysts when they are formulated into the electrode structure of the invention. In the case of an anode structure for a PEMFC, the ion conducting material is a proton conducting material, which can be the same as that employed as the polymeric electrolyte membrane of the MEA.

The Pt—M or Pt-X alloy is preferably more than a mere physical mixture of Pt with metal(s), since the platinum and metal(s) are preferably heat-treated to promote a measurable interaction between the platinum and metal(s) to change the intrinsic properties of the platinum metal. Heat-treatment causes a significant number of atoms of the metal(s) to be incorporated into the atomic crystal lattice, or unit cell, of the platinum particle. This process usually distorts the dimensions of the platinum unit cell, since the atoms of the metal(s) will generally be of a different size from those of the platinum, and this can usually be measured by techniques such as X-ray diffraction. The characteristic dimensions of the platinum unit cell, referred to by crystallographers as the lattice parameter, can be shown to have altered due to the fact that two or more metals, with different atomic sizes, have been incorporated into a single, homogeneous metal alloy particle at the atomic level.

Preferably, the one or more metals(s) X or M, when present, is or are selected from the groups IVB, VB, VIB, VIIB, VIII, IB, IIB, IIIA or IVA of the Periodic Table in "Handbook of Chemistry and Physics" 64th Edition, CRC Press; for example, X metals can be from the group Ru, Rh, Ti, Cr, Mn, Fe, Co, Ni, Cu, V, Ga, Zr, Hf and Sn; especially Ru, Mn, Ti, Co, Ni and Rh and M metals can be from the same group especially Ru and Rh.

Component Y may either be alloyed with the Pt-X alloy (the resulting alloy being as defined hereinbefore) or may be unalloyed but in physical contact with the alloy. Component Y may be a bronze-forming element or an oxide thereof. A 'bronze' material is defined by Wold and Dwight in Solid State Chemistry—Synthesis, Structure, and Properties of Selected Oxides and Sulfides, Chapman & Hall as ". . . an oxide with intense colour (or black), having a metallic lustre and showing either semi-conducting or metallic behaviour. A principle characteristic of bronzes is their range of composition, which results in the transition metal exhibiting a variable formal valence." Suitable bronzes include non-stoichiometric alloys of the transition metal with hydrogen.

The component Y is suitably selected from one or more of the Group IVB to VIB elements and rhenium or an oxide thereof, for example Ti, V, Nb, Ta, Mo, W, Re, or an oxide thereof; suitably Ti, V, Ta, Mo, W, or an oxide thereof; preferably Mo or W, or an oxide thereof.

Preferably, the second catalytic component is one wherein the Pt—M is Pt (alone) or an alloy (as defined) of Pt/Ru.

The term "electrode structure" in the context of the present invention means the specific compositional aspects of those parts of the electrochemical cell at which the electrochemical reactions take place. It does not specifically refer to any particular physical embodiment of the invention. The physical embodiments of the invention can take several forms. The electrocatalyst materials can be applied to one side of a gas diffusion substrate material to produce an electrode, which can be either an anode or cathode, comprising the electrode structure of the invention.

Thus in a further aspect, the present invention provides an electrode comprising an electrode structure of the present invention wherein the electrocatalyst materials are present on one side of a gas diffusion substrate material.

Alternatively the electrocatalyst materials can be applied to one side of the polymer electrolyte membrane material to produce a catalysed membrane, comprising the electrode structure of the invention.

Thus in a further aspect the present invention provides a catalysed membrane comprising an electrode structure according to the present invention wherein the electrocatalyst materials are present on one side of the polymer electrolyte membrane material.

An MEA for use in, for example, a PEMFC, as herein described is a five layer unit, comprising a polymer electrolyte membrane in the center, with an electrocatalyst containing layer on either side of the membrane and a gas diffusion substrate layer in contact with the electrocatalyst containing layers on the opposite face of the layer to that in contact with the membrane. An MEA comprising the electrode structure of the invention, can be formed from electrodes as defined above, by bonding two electrodes, at least one of which comprises the electrode structure of the invention, either side of a polymer electrolyte membrane. Alternatively the MEA may be formed from the catalysed membrane by applying gas diffusion substrate materials either side of a catalysed membrane, in which at least one catalysed side of the membrane comprises the electrode structure of the invention.

Thus in a further aspect, the present invention provides an MEA comprising an electrode structure according to the present invention.

In the above aspects of the present invention namely when formed into electrodes, catalysed membranes or an MEA from either of these two components, the two catalyst materials can be formulated into two separate layers which are applied to one side of either the gas diffusion substrate material or to the polymer electrolyte membrane, but in which they are still functionally linked. It is also possible that the two catalyst materials may be mixed together and formed into one layer containing both catalysts and applied to one side of either the gas diffusion substrate material or the polymer electrolyte membrane.

An electrode comprising the electrode structure of the invention may be formed wherein each catalyst is formulated into a separate layer in which a first layer comprising the first catalyst material; as herein defined, is in contact with one side of the gas diffusion substrate material, and a second layer comprising the second catalyst material is in contact with the opposite face of the first catalyst layer to that in contact with the gas diffusion substrate. Alternatively a catalysed membrane comprising the electrode structure of the invention may be formed wherein each catalyst is formulated into a separate layer in which a first layer comprising the second catalyst material, as herein defined, is in contact with one side of the polymer electrolyte membrane material, and the second layer comprising the first catalyst material is in contact with the opposite face of the second catalyst layer to that in contact with the polymer electrolyte membrane.

In a future aspect, the present invention provides a fuel cell comprising an electrode structure, comprising a first catalytic component and a second catalytic component, characterised in that the first catalytic component comprises one or more electrocatalyst(s) of formula Pt—Y where Y is a bronze forming element, and optionally a third metal component X which is alloyed with the platinum, and the second catalytic component which comprises one or more electrocatalyst(s) of formula Pt—M where M is a metal alloyed with the platinum.

In a final aspect, the present invention provides the use of an electrode structure according to the present invention in a fuel cell.

The invention will now be described further with reference to the following Examples and drawings in which:

FIG. 1: shows fuel cell performance data of cell voltage vs time for operation of two PtRu (thick line and line with ●), PtRuW (line with ■), PtTiW (line with X) and PtCoMo (line with ▲) catalysts in a gas stream containing 100 ppm CO in hydrogen. The anode platinum loadings are respectively 0.37, 0.25, 0.29, 0.45 and 0.29 mgPt/cm$^2$.

Figure 2:
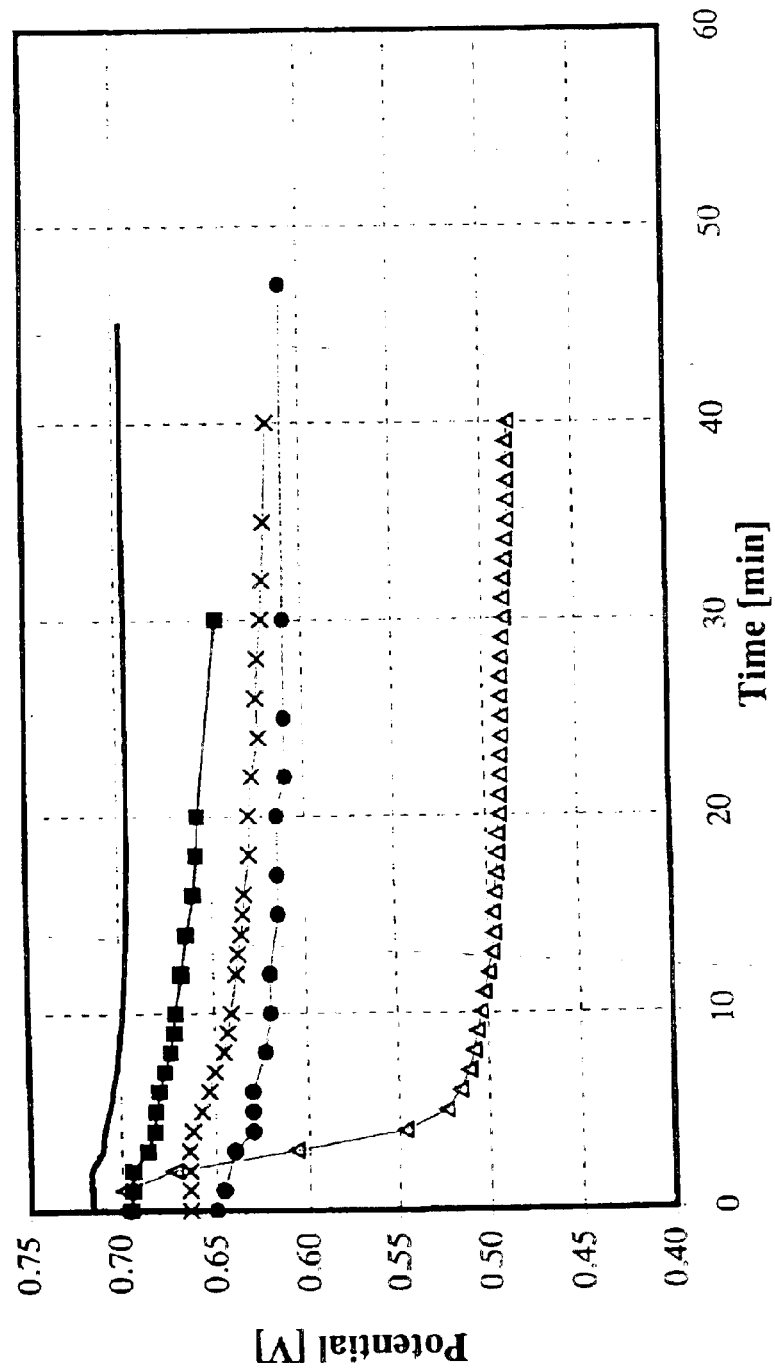

FIG. 2: shows fuel cell performance data of cell voltage vs time for operation of the two PtRu (thick line and line with ●), PtRuW (line with ■), PtTiW (line with X) and PtCoMo (line with ▲) catalysts in a gas stream containing 25% $CO_2$ and 75% hydrogen. The anode platinum loadings are the same as in FIG. 1.

Figure 3:
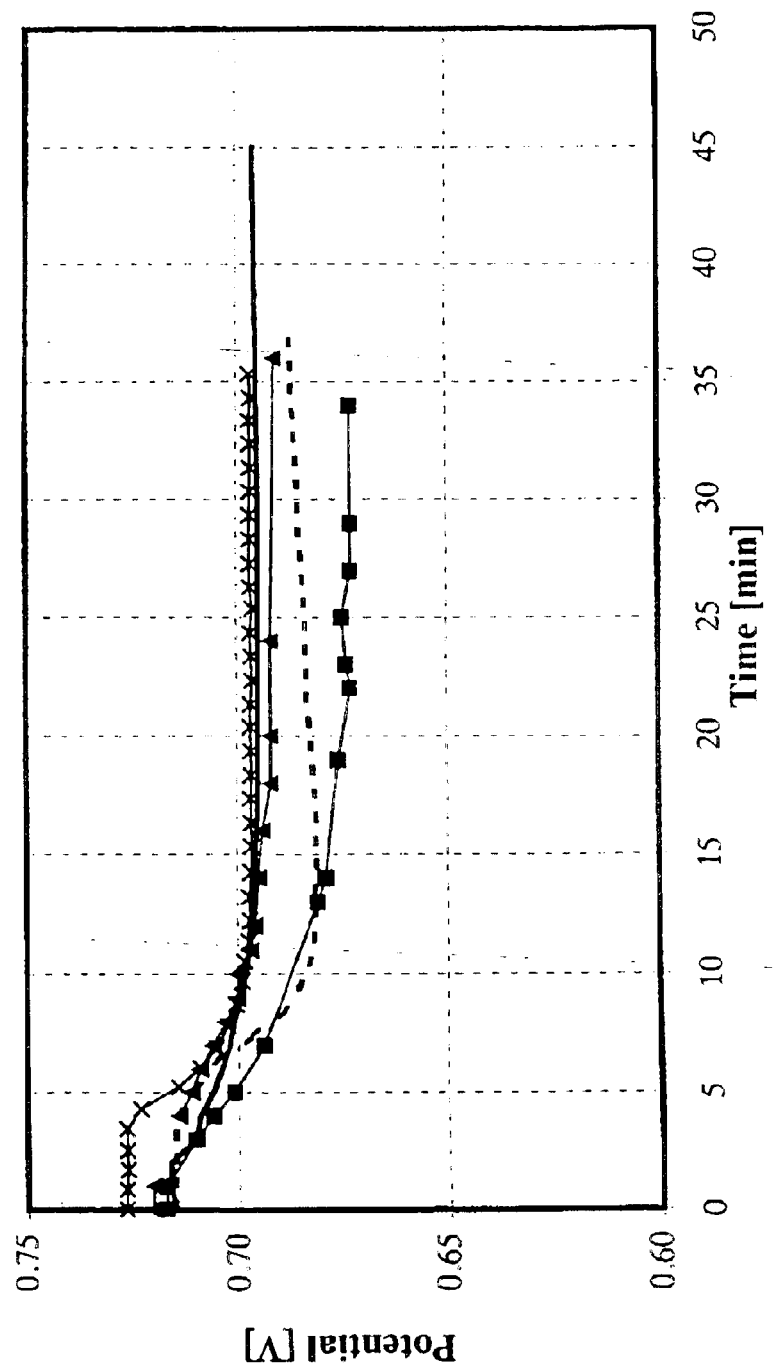

FIG. 3 presents single cell performance data for electrode bilayers according to the invention operating in 25% $CO_2$ and 75% hydrogen. The bilayers comprise of catalyst layers of PtTiW (line with X), PtRuW (line with ■), PtCoMo (line with ▲) and PtCoW (dashed line) containing 0.16, 0.12, 0.26 and 0.27 mg Pt cm$^{-2}$ and layers of PtRu catalyst at loadings of 0.13, 0.25, 0.14 and 0.24 mg Pt cm$^{-2}$, respectively. FIG. 3 also shows the comparative example PtRu (thick line) which is also presented in FIG. 1.

Figure 4:
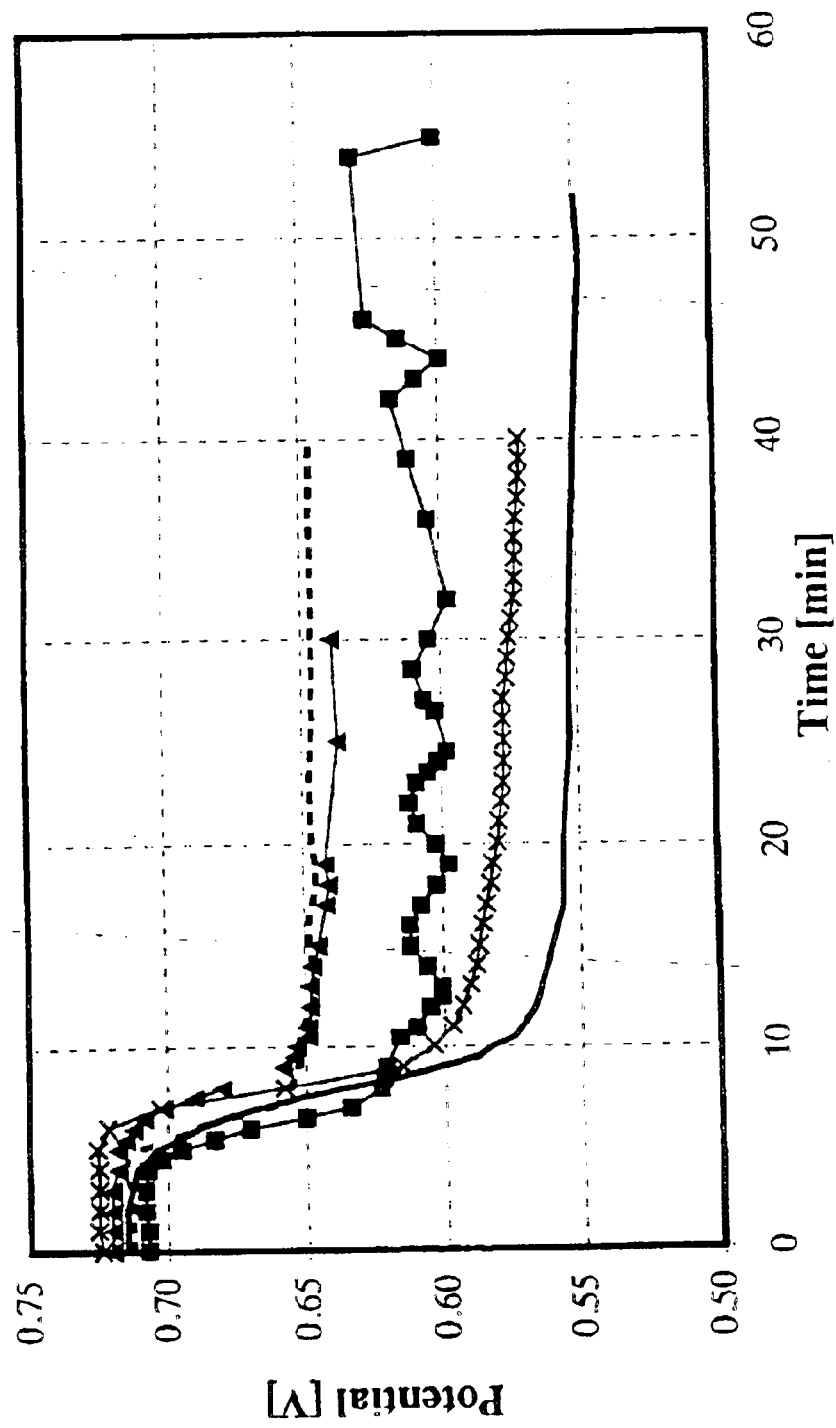

FIG. 4 shows that, at the same time, the performance of the bilayer electrodes of the invention in hydrogen containing 100 ppm CO is significantly improved over the comparative PtRu sample performance decay, while the total platinum loading in both layers is very similar in all cases.

Figure 5:
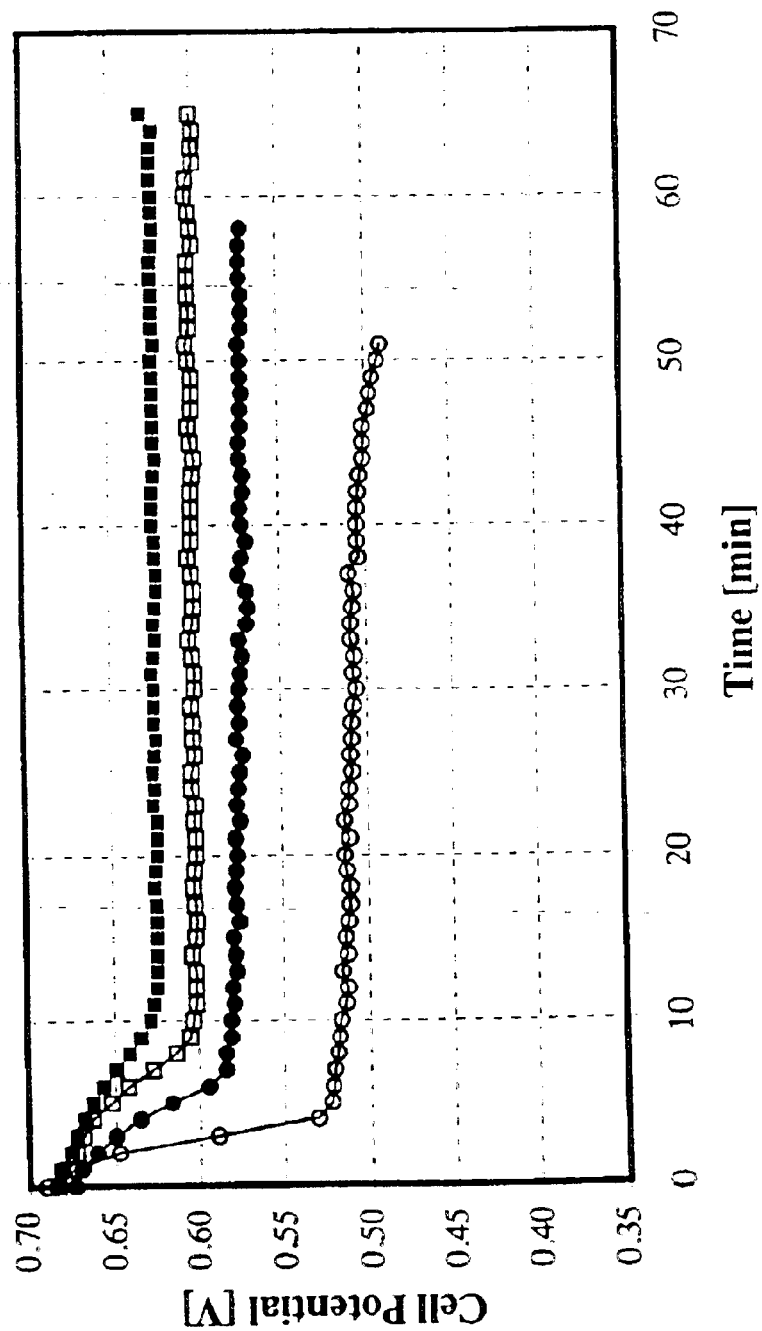

FIG. 5 shows the single cell performances of two MEA's, one an electrode bilayer according to the invention, and the other a single catalyst layer, operating on gas mixtures of CO and $CO_2$ in hydrogen, which has been used to simulate reformate gas compositions. The MEA's have been tested on two different gas mixtures; 40 ppm CO and 25% $CO_2$ in hydrogen (closed symbols), and 100 ppm CO and 25% $CO_2$ in hydrogen (open symbols). The bilayer comprises of a catalyst layer of PtCoMo at loadings of 0.15 mg Pt/$cm^2$ and a layer of a PtRu catalyst at a loading of 0.31 mg pt/$cm^2$ (lines with squares). The single layer electrode comprised of the same PtRu catalyst at a loading of 0.29 mg Pt/$cm^2$ (lines with circles).

COMPARATIVE EXAMPLE 1

A catalyst containing platinum and ruthenium at 41.80 wt % Pt and 20.78 wt % Ru supported on Cabot Vulcan XC72R carbon, was prepared using a process comprising the deposition of Pt onto the conductive carbon black substrate by the hydrolysis of an aqueous solution of chloroplatinic acid and ruthenium trichloride by a solution of sodium hydrogen carbonate in the presence of the carbon black, as disclosed in EP 450 849. The catalyst was reduced using aqueous formaldehyde solution, filtered, washed free of soluble chloride salts and dried at 100° C. X-ray diffraction analysis of the resulting catalyst showed a single cubic phase with a lattice parameter of 3.87x, indicating significant alloying of the Ru with the Pt. From this catalyst, a catalyst ink was prepared and a fuel cell anode was printed onto pre-teflonated Toray TPG90 paper. Inks and electrodes are prepared as detailed in Example 2 of European patent specification no. EPA 731 520. The platinum loading of this electrode was 0.37 mgPt/$cm^2$.

COMPARATIVE EXAMPLE 2

A catalyst containing platinum and ruthenium at 19.2 wt % Pt and 9.3 wt % Ru supported on Cabot Vulcan XC72R carbon, was prepared using the process as described in Comparative Example 1 and as disclosed in EP 450 849. X-ray diffraction analysis of the resulting catalyst showed a single cubic phase with a lattice parameter of 3.88x, indicating significant alloying of the Ru with the Pt. An Electrode was prepared in the same way as described in Comparative Example 1. The platinum loading of this electrode was 0.25 mgPt/$cm^2$.

COMPARATIVE EXAMPLE 3

A catalyst containing platinum, ruthenium and tungsten at 16.65 wt % Pt, 8.32 wt % Ru and 10.77 wt % W was prepared. A PtRu catalyst (7.5 g), as described in Comparative Example 2, was slurried in 1 liter of demineralised water for one hour. A 1 wt % solution of sodium tungstate in demineralised water was prepared containing 1.98 g tungsten. This solution was converted to tungstic acid by passing it through an exchange column, comprising Dowex 50-X8 ion-exchange resin, and fed directly into the slurry. The resultant catalyst was stirred overnight and then filtered, dried at 105° C. in air and fired at 500° C. in a gas mixture containing 6% CO in $CO_2$. X-ray diffraction analysis of the resulting catalyst showed a single cubic phase with a lattice parameter of 3.87x, indicting significant alloying of the Ru with the Pt, together with the presence of crystalline $WO_3$. An electrode containing this catalyst was prepared in the same way as described in Comparative Example 1. The platinum loading of this electrode was 0.29 mgPt/$cm^2$.

COMPARATIVE EXAMPLE 4

A catalyst containing Pt, Ti and W at 34.41 wt % Pt, 2.02 wt % Ti and 10.63 wt % W was prepared. To a stirred suspension of Cabot Vulcan XC72R carbon (16 g) in a 6 liter solution of potassium hydrogen carbonate (25 g) under reflux, was added a 2 wt % solution of chloroplatinic acid (containing 8 g Pt). The resulting slurry was filtered, and washed with demineralised water until no chloride was detectable in the washings. The catalyst was dried at 100° C. in air. The catalyst was re-slurried in a liter solution of potassium hydrogen carbonate (2.5 g) and heated till under reflux. A 2 wt % solution of titanium trichloride (containing 0.45 g Ti) and urea (3.39 g) was added dropwise. The ratio of alkali to metal salts for both steps was such as to ensure complete hydrolysis and precipitation of the metal hydrous oxides/hydroxides onto the carbon.

The slurry was filtered, and washed with demineralised water until no chloride was detectable in the washings. The wet cake was then dispersed in a liter of demineralised water. To this slurry was added dropwise a 1 wt % solution of tungsten (2.32 g) in water. This was prepared by the dissolution of tungsten powder in hydrogen peroxide solution, followed by decomposition of the excess peroxide by platinum black. The combined slurry was then evaporated to dryness. The resulting catalyst was then heated at 650° C. in flowing 5% hydrogen in nitrogen for 1 hour. X-ray diffraction analysis of the resulting catalyst showed a single cubic phase with a lattice parameter of 3.93x, which indicated little alloying of the components. An electrode containing this catalyst was prepared in the same way as described in Comparative Example 1. The platinum loading of this electrode was 0.45 mg/$cm^2$.

COMPARATIVE EXAMPLE 5

A catalyst containing Pt, Co and Mo at 21.0 wt % Pt, 0.2 wt % Co and 1.0 wt % Mo was prepared. To a stirred suspension of Cabot Vulcan XC72R carbon (94.5 g) in a 6 liter solution of sodium hydrogen carbonate (67.4 g) under reflux, was added first a 2 wt % solution of chloroplatinic acid (containing 24.2 g Pt), followed by a 2 wt % solution of cobalt dichloride (containing 1.7 g Co). The amount of sodium hydrogen carbonate was calculated to be sufficient to just precipitate both Pt and Co as their hydrous oxides/hydroxides. The resulting catalyst was filtered, washed with demineralised $H_2O$ until chloride free and dried at 100° C. A portion of the dried catalyst (21.8 g) was reslurried in 1.5 liters of demineralised $H_2O$ and stirred. To this was added disodium molybdate dihydrate (1.7 g) and the slurry stirred until complete dissolution. To the resulting slurry was added a solution of 1,8-hydroxyquinoline (1.0 g) in 40 $cm^3$ of ethanol. The amount of 1,8-hydroxyquinoline added being 2 molar equivalents of the amount of Mo added. The slurry was heated until under reflux and the pH adjusted to 4 by the addition of acetic acid. The slurry was boiled for 60 minutes to remove the ethanol, after which the slurry was cooled, filtered, washed free of salts and dried at 100° C. The dried catalyst was heat treated under flowing 10% $H_2/N_2$ for 1 hour at 650° C. to decompose the 1,8-hydroxyquinoline. X-ray diffraction of resulting catalyst showed a single cubic phase with a lattice parameter of 3.91, which indicates little alloying of the components. An electrode containing this catalyst was prepared in the same way as described in Comparative Example 1. The platinum loading of this electrode was 0.29 mgPt/$cm^2$.

COMPARATIVE EXAMPLE 6

A catalyst containing Pt and Ru at 38.7 wt % Pt and 20.7 wt % Ru supported on Cabot Vulcan XC72R carbon was prepared as described in Comparative Example 1. X-ray analysis of the resulting catalyst showed a single cubic phase with a lattice parameter of 3.90x, indicating significant alloying of the Ru with the Pt. An electrode containing this catalyst at a platinum loading of 0.29 mgPt/cm$^2$ was prepared as described in Comparative Example 1.

EXAMPLE 1

(Pt/Mo/Co)/(Pt/Ru)

A catalyst containing Pt, Mo and Co at 20.30 wt % Pt, 1.44 wt % Co and 0.65 wt % Mo was prepared. To a stirred suspension of Cabot Vulcan XC72R carbon (30.2 g) in a solution of sodium hydrogen carbonate (22.3 g) under reflux, was added a 2 wt % solution of chloroplatinic acid (containing 8 g Pt) and cobalt dichloride (containing 0.6 g Co). After refluxing for 2.5 hrs, the resulting slurry was filtered, and washed with demineralised water until no chloride was detectable in the washings. The catalyst was dried at 100° C. in air.

The dried catalyst was then re-dispersed in 1 liter of demineralised water for one hour at ambient temperature. To this slurry was added a solution of molybdenum (1.21 g) prepared by passing a 1 wt % solution of sodium molybdate through an ion exchange column containing Dowex 50-X8 ion exchange resin to covert to colloidal molybdic acid. The combined slurry was then evaporated to dryness. The resulting catalyst was then heated at 695° C. in flowing 5% hydrogen in nitrogen to ensure reduction and alloying of the components. X-ray diffraction analysis of the resulting catalyst showed a single cubic phase with a lattice parameter of 3.87x, indicating significant alloying of the components An electrode containing the catalyst at a platinum loading of 0.26 mgPt/cm$^2$ was prepared as described in Comparative Example 1. On top of this catalyst layer, an additional layer of PtRu catalyst made according to Comparative Example 1 was applied using the method described in Comparative Example 1. The additional Pt loading in this catalyst layer was 0.14 mgPt/cm$^2$.

EXAMPLE 2

(Pt/W/Co)/(Pt/Ru)

A catalyst containing Pt, W and Co at 14.7 wt % Pt, 1.0 wt % Co and 3.8 wt % W was prepared. To a stirred suspension of Cabot Vulcan XC72 R carbon (32 g) in 6 liters of a solution of sodium hydrogen carbonate (1.85 g) under reflux, was added a 2 wt % solution of chloroplatinic acid (containing 5.7 g Pt). The resulting slurry was heated under reflux for 2 hrs, before being filtered and washed with demineralised water, until no chloride was detected in the washings. The catalyst was then dried at 100° C. in air. The dried catalyst was re-dispersed in 6 liters of sodium hydrogen carbonate (1.1 g) solution and heated till under reflux. To this slurry was added a 2 wt % solution of cobalt dichloride (containing 0.4 g Co). The slurry was then filtered and washed with demineralised water until no chloride was detected in the washings. The wet cake was re-slurried in 1 liter of demineralised water for 1 hr at ambient temperature. To this was added was added a solution of tungsten (1.5 g). The tungsten solution was prepared by dissolving tungsten powder in hydrogen peroxide (100 cm$^3$ of 28 wt % $H_2O_2$ solution), followed by decomposition of the excess peroxide by platinum black, and subsequent dilution to a 1 wt % solution by dimineralised water. The combined slurry was then evaporated to dryness. The resulting catalyst was then heated to 900° C. in flowing nitrogen for 1 hour. X-ray diffraction analysis of the resulting catalyst showed a single cubic phase with a lattice parameter of 3.90x indicating significant alloying of the components.

An electrode containing this catalyst at a platinum loading of 0.27 mgPt/cm$^2$ was prepared as described in Comparative Example 1. On top of this catalyst layer, an additional layer of a catalyst containing Pt and Ru at 37.1 wt % Pt and 17.9 wt % Ru supported on Cabot Vulcan XC72R carbon was prepared as described in Comparative Example 1, was applied using the method described in Comparative Example 1. The additional Pt loading in this catalyst layer was 0.24 mgPt/cm$^2$. X-ray analysis of this catalyst showed a single cubic phase with a lattice parameter of 3.90x, indicating significant alloying of the Ru with the Pt. An electrode containing this catalyst at a platinum loading of 0.29 mgPt/cm$^2$ was prepared as described in Comparative Example 1.

EXAMPLE 3

(Pt/Ru/W)/(Pt/Ru)

A catalyst containing Pt, Ru and W was prepared as described in Comparative Example 2. An electrode containing this catalyst at a platinum loading of 0.12 mgPt/cm$^2$ was prepared as described in Comparative Example 1. On top of this catalyst layer, an additional layer of PtRu catalyst as used in Example 2 was applied using the method described in Comparative Example 1. The additional Pt loading in this catalyst layer was 0.25 mgPt/cm$^2$.

EXAMPLE 4

(Pt/Ti/W)/(Pt/Ru)

A catalyst containing Pt, Ti and W was prepared as described in Comparative Example 4. An electrode containing this catalyst at a platinum loading of 0.16 mgPt/cm$^2$ was prepared as described in Comparative Example 1. On top of this catalyst layer, an additional layer of PtRu catalyst made according to Comparative Example 2 was applied using the method described in Comparative Example 1. The additional Pt loading in this catalyst layer was 0.13 mgPt/cm$^2$.

EXAMPLE 5

(PtMoCo)/(PtRu)

A catalyst containing Pt, Co and Mo was prepared as described in Comparative Example 5. An electrode containing this catalyst at a platinum loading of 0.15 mgPt/cm$^2$ was prepared as described in Comparative Example 1. On top of this catalyst layer, an additional layer of PtRu catalyst made according to Comparative Example 6 was applied using the method described in Comparative Example 1. The addition loading in this catalyst layer was 0.31 mgPtcm$^{-2}$.

TABLE 1

| Example Number | Catalyst | Assay Characterisation Data/ wt % of total catalyst weight | | | | XRD Characterisation | |
|---|---|---|---|---|---|---|---|
| | | Pt | 2nd Metal | 3rd Metal | Atomic Ratio | Crystallite Size/ nm | Pt lattice parameter/ X |
| Comp. 1 | PtRu | 41.80 | 20.78 | | 51:49 | 2.6 | 3.87 |
| Comp. 2 | PtRu | 19.2 | 9.3 | | 52:48 | 1.9 | 3.88 |
| Comp. 3 | PtRuW | 16.65 | 8.32 | 10.77 | 38:36:26 | 4.6 | 3.87 |
| Comp. 4 | PtTiW | 34.41 | 2.02 | 10.63 | 64:15:21 | 5.6 | 3.93 |
| Comp. 5 | PtCoMo | 21.9 | 0.2 | 1.0 | 89:03:08 | 4.5 | 3.91 |
| Comp. 6 | PtRu | 38.7 | 20.7 | | 49:51 | 2.7 | 3.90 |
| 1 | PtCoMo | 20.30 | 1.44 | 0.65 | 77:18:05 | 4.2 | 3.87 |
| | PtRu | 41.80 | 20.78 | | 51:49 | 2.6 | 3.87 |
| 2 | PtCoW | 14.7 | 1.0 | 3.76 | 67:15:18 | 3.1 | 3.90 |
| | PtRu | 19.2 | 9.3 | | 52:48 | 1.9 | 3.88 |
| 3 | PtRuW | 16.65 | 8.32 | 10.77 | 38:36:26 | 4.6 | 3.87 |
| | PtRu | 37.06 | 17.89 | | 52:48 | 3.2 | 3.90 |
| 4 | PtTiW | 34.41 | 2.02 | 10.63 | 64:15:21 | 5.6 | 3.93 |
| | PtRu | 19.2 | 9.3 | | 52:48 | 1.9 | 3.88 |
| 5 | PtCoMo | 21.9 | 0.2 | 1.0 | 89:03:08 | 4.5 | 3.91 |
| | PtRu | 38.7 | 20.7 | | 49:51 | 2.7 | 3.90 |

EXAMPLE 6

PREPARATION OF MEAs

The electrode structures of the invention were first produced as anodes and then bonded to membranes to form MEAs as described in Example 2 of EP 731 520. The MEA was fabricated by hot-pressing the anode and a pure platinum catalyst cathode (with a platinum loading of 0.6 mg Pt/cm$^2$) against each face of a solid proton-conducting electrolyte membrane. The membrane used was the perfluorinated membrane Nafion® 115 (from Du Pont de Nemours). MEAs of 6.5 cm$^2$ area were formed by hot-pressing at pressures of 100 psi (1 psi=6.89×10$^3$ N/m$^2$) over the MEA, at temperatures exceeding the glass transition temperature of the membrane, as is commonly practised in the art. MEAs of 240 cm$^2$ area were formed by hot pressing at pressures of 400 psi over the MEA.

EXAMPLE 7

PERFORMANCE EVALUATION

The MEAs were evaluated in a PEMFC single cell. The single cell consists of graphite plates into which flowfields are machined to distribute the reactant gases, humidification water and heating and cooling water and to remove products. The MEA was located between the appropriate flowfield plates. The cell is compressed, typically to a gauge pressure of 70 psig above the reactant gas pressure.

The "fuel cell performance" was assessed by measuring the voltage at a fixed current density of 500 mA cm$^{-2}$. The fuel cell operated under conditions representative of those employed in practical PEM fuel cells. These conditions were typically a reactant gas inlet temperature of 80° C., a pressure of both hydrogen and air reactants of 3 atmospheres. For 6.45 cm$^2$ MEAS, the reactant gas streams were kept constant at 0.1 SLPM (standard liters at 1 bar and 0° C. per minute); 0.125 SLPM for 25% $CO_2$ and 75% hydrogen; and 0.4 SLPM for oxygen. For 240 cm$^2$ MEAs, the fuel to air gas stoichiometry was 1.5/2. For the single cell reformate tolerance experiments, the anode gas stream was changed at time t=0 from pure hydrogen to gas streams composed of 100 ppm CO in hydrogen, 25% $CO_2$, in hydrogen, 40 ppm CO and 25% $CO_2$ in hydrogen or 100 ppm CO and 25% $CO_2$, in hydrogen. The fuel cell performance using the binary gas mixtures was performed using the 6.45 cm$^2$ MEAs, while testing using the ternary gas mixtures was performed using the 240 cm$^2$ MEAs. At constant current density of 0.5 Acm$^{-2}$, the cell potential was then monitored with time in order to assess the CO and the $CO_2$ tolerance of different catalysts under practical conditions. Table 2 summarises the CO, $CO_2$ and CO/$CO_2$ tolerances of the catalysts described in the Examples in the form of voltage losses (in mV) on the different poisoning gas streams, when compared to operation on pure hydrogen. The lower the voltage loss, the more resistant the catalyst or catalyst combination is towards being poisoned on that particular gas stream.

FIG. 1 shows fuel cell performance data of cell voltage vs time for operation of two PtRu, PtRuW, PtTiW and PtCoMo catalysts in a gas stream containing 100 ppm CO in hydrogen. The anode platinum loadings are respectively 0.37, 0.25, 0.29, 0.45 and 0.29 mg Pt/cm$^2$. FIG. 1 shows that the single cell voltages for all five MEAs decay from their value at t=0 min when the cell is operated with pure hydrogen. FIG. 1 shows that the performance curves of the two MEAs containing PtRu anode-catalysts, one labelled "standard" PtRu and the other labelled "advanced" PtRu. This represents the range of CO tolerance performance found with state of the art PtRu catalysts as a function of Pt loading on the carbon and Pt loading in the catalyst layer. The MEA containing the advanced PtRu catalyst, shows the lowest drop in performance on switching between pure hydrogen and 100 ppm CO in hydrogen. This catalyst has a higher Pt loading on carbon and a higher loading of catalyst in the electrode compared to the standard PtRu catalyst. The electrode containing the advanced PtRu catalyst would be expected to give a higher performance due to the higher density of Pt in the catalyst layer. The performance curves of the MEA's containing the three ternary catalysts, PtRuW, PtriW and PtCoMo on 100 ppm CO in hydrogen show them lying between the two PtRu performance curves, indicating comparable CO tolerance. Considering that the dispersion of the catalyst particles as shown in Table 1 as Pt crystallite size, are significantly inferior to those displayed by the two PtRu catalysts, then these catalysts are intrinsically more CO tolerant than state of the art PtRu catalysts, in terms of specific activity (ie activity per actual surface area of Pt present).

FIG. 2 shows fuel cell performance data of cell voltage vs time for operation of the two PtRu, PtRuW, PtTiW and PtCoMo catalysts in a gas stream containing 25% $CO_2$ and 75% hydrogen. The anode platinum loadings are the same as in FIG. 1. FIG. 2 shows that the single cell voltages for al five MEAs decay from their value at t=0 min when the cell is operated with pure hydrogen. The performances of the electrodes containing the PtRu catalysts degrades by 19 and 38 mV respectively, on the introduction of the gas mixture containing 25% $CO_2$ and 75% hydrogen. In contrast, the performance of the electrodes containing the three ternary catalysts degrade by larger amounts, with the PtCoMo catalyst losing 211 mV on introduction of the $CO_2/H_2$ gas mixture. This shows that although the ternary catalysts have good CO tolerance, they have inferior $CO_2$ tolerance to the 'state-of-the-art' PtRu catalysts.

FIG. 3 presents single cell performance data for electrode bilayers according to the invention operating in 25% $CO_2$ and 75% hydrogen. The bilayers comprise of catalyst layers of PtTiW, PTRuW, PtCoMo and PtCoW containing 0.16, 0.12, 0.26 and 0.27 mg Pt $cm^{-2}$ and layers of PtRu catalyst at loadings of 0.13, 0.25, 0.14 and 0.24 mg Pt $cm^{-2}$, respectively. FIG. 3 also shows the comparative example PtRu which is also presented in FIG. 1. The bilayer electrodes according to the invention show small decays when the gas stream is changed at t=0 min from pure hydrogen to 25% $CO_2$ and 75% hydrogen. The performance decay of the PtRuW catalyst when as a bilayer with PtRu shows a significant reduction. The other electrode samples exhibit a decay around 25 mV, very close to the comparative PtRu electrode. Therefore, the combination of Pt ternary catalysts with PtRu catalysts, has overcome the $CO_2$ "in-tolerance" of these catalyst seen, when tested as single catalyst layers.

FIG. 4 shows that, at the same time, the performance of the bilayer electrodes of the invention in hydrogen containing 100 ppm CO is significantly improved over the comparative PtRu sample. When at t=0 min the gas stream is changed from pure hydrogen to hydrogen containing 100 ppm CO, all samples exhibit, after some induction time, a decay of the single cell voltage. This decay is 166 mV for the comparative PtRu sample. All bilayer samples show lower performance decay, while the total platinum loading in both layers is very similar in all cases. The PtCoMo/PtRu bilayer electrode of the invention shows a performance decay as low as approximately 88 mV. In addition, the PtCoW/PtRu bilayer electrode of the invention shows a performance decay of 73 mV, although with a higher overall electrode loading of 0.51 mg Pt/$cm^2$.

FIG. 5 shows the single cell performances of two MEA's, one an electrode bilayer according to the invention, and the other a single catalyst layer, operating on gas mixtures of CO and $CO_2$ in hydrogen, which has been used to simulate reformate gas compositions. The MEA's have been tested on two different gas mixtures; 40 ppm CO and 25% $CO_2$ in hydrogen, and 100 ppm CO and 25% $CO_2$, in hydrogen. The bilayer comprises of a catalyst layer of PtCoMo at loadings of 0.15 mg Pt/$cm^2$ and a layer of a PtRu catalyst at a loading of 0.31 mg Pt/$cm^2$. The single layer electrode comprised of the same PtRu catalyst at a loading of 0.29 mg Pt/$cm^2$. FIG. 5 shows that the performance of the bilayer electrode is superior to the single layer with both the gas mixtures tested. In particular, the differences between the two electrodes is increased with the gas mixture with 100 ppm CO.

Clearly, the bilayer electrode according to the invention shows improved performance when tested in gas streams of CO in hydrogen, $CO_2$ in hydrogen and mixtures of CO and $CO_2$ in hydrogen, when compared to single layer electrodes of similar Pt loading. In particular, the combination of two different catalysts within the bilayer electrode have shown unexpectedly improved performances based on their performances as single layers.

TABLE 2

| Example | Catalyst(s) | Pt loading/ mg Pt$cm^{-2}$ | Voltage Losses on Different Poisoning Gas Streams/mV | | | |
|---|---|---|---|---|---|---|
| | | | 100 ppm CO/ $H_2$ | 25% $CO2/H_2$ | 40 ppm CO/ 25% $CO_2/H_2$ | 100 ppm CO/ 25% $CO_2/H_2$ |
| Comp. 1 | PtRu | 0.37 | 166 | 19 | — | — |
| Comp. 2 | PtRu | 0.25 | 325 | 38 | — | — |
| Comp. 3 | PtRuW | 0.29 | 177 | 56 | — | — |
| Comp. 4 | PtTiW | 0.45 | 195 | 51 | — | — |
| Comp. 5 | PtCoMo | 0.29 | 274 | 211 | — | — |
| Comp. 6 | PtRu | 0.29 | — | — | 114 | 173 |
| 1 | PtCoMo/PtRu | 0.26/0.14 | 88 | 29 | — | — |
| 2 | PtCoW/PtRu | 0.27/0.24 | 73 | 22 | — | — |
| 3 | PtRuW/PtRu | 0.12/0.25 | 110 | 44 | — | — |
| 4 | PtTiW/PtRu | 0.16/0.13 | 165 | 29 | — | — |
| 5 | PtCoMo/PtRu | 0.15/0.31 | — | — | 61 | 83 |

What is claimed is:

1. An electrode structure comprising a first catalytic component and a second catalytic component, wherein:
   (a) said first catalytic component comprises one or more electrocatalyst(s) comprising a formula Pt—Y, wherein Y is Mo, W or an oxide of Mo or W; and
   (b) said second catalytic component comprises one or more electrocatalyst(s) comprising a formula Pt—M, where M is a metal alloyed with the platinum and is one or more metals selected from the group consisting of Ru, Rh, Ti, Cr, Mn, Fe, Co, Ni, Cu, Ga, Zr, Hf and Sn; and
wherein the first and second catalytic components are formulated into two separate layers that are functionally linked and are in ionic contact with each other.

2. An electrode structure according to claim 1, wherein M is selected from Ru or Rh.

3. An electrode structure according to claim 1, wherein the first catalytic component is selected from the group consisting of: Pt/Mo, Pt/Mo/Co, Pt/W/Co, Pt/Ru/$WO_3$ and Pt/Ti/W; and the second catalytic component is Pt/Ru.

4. An electrode comprising an electrode structure according to claim 1 wherein the electrocatalyst materials are present on one side of a gas diffusion material.

5. A catalyzed membrane comprising an electrode structure according to claim 1 wherein the electrocatalyst materials are present on one side of a polymer electrolyte membrane material.

6. An MEA comprising an electrode structure according to claim 1.

7. A fuel cell comprising an electrode structure, comprising a first catalytic component and a second catalytic component, characterized in that the first catalytic component comprises one or more electrocatalyst(s) comprising a formula Pt—Y where Y is Mo, W, or an oxide of Mo or W, and the second catalytic component comprises one or more electrocatalyst(s) comprising a formula Pt—M, where M is a metal alloyed with the platinum and is one or more metals selected from the group consisting of Ru, Rh, Ti, Cr, Mn, Fe, Co, Ni, Cu, Ga, Zr, Hf and Sn, and wherein the first and second catalytic components are formulated into two separate layers that are functionally linked and are in ionic contact with each other.

8. An electrode structure according to claim 1 wherein said first catalytic component comprises a third metal component X which is alloyed with the platinum and which is one or more metals selected from the group consisting of Ru, Rh, Ti, Cr, Mn, Fe, Co, Ni, Cu, Ga, Zr, Hf and Sn.

9. An electrode structure according to claim 8 wherein X is selected from the group consisting of Ru, Mn, Co, Ni, and Rh.

10. A fuel cell according to claim 7 wherein said first catalytic component comprises a third metal component X which is alloyed with the platinum and which is one or more metals selected from the group consisting of Ru, Rh, Ti, Cr, Mn, Fe, Co, Ni, Cu, Ga, Zr, Hf and Sn.

11. The electrode structure according to claim 1 wherein Y is Mo and M is Ru.

* * * * *